(12) United States Patent
Kitamura

(10) Patent No.: US 11,156,696 B2
(45) Date of Patent: Oct. 26, 2021

(54) RADAR APPARATUS

(71) Applicant: DENSO CORPORATION, Kariya (JP)

(72) Inventor: Takayuki Kitamura, Kariya (JP)

(73) Assignee: DENSO CORPORATION, Kariya (JP)

(*) Notice: Subject to any disclaimer, the term of this patent is extended or adjusted under 35 U.S.C. 154(b) by 0 days.

(21) Appl. No.: 16/936,394

(22) Filed: Jul. 22, 2020

(65) Prior Publication Data
US 2020/0355789 A1  Nov. 12, 2020

Related U.S. Application Data

(63) Continuation of application No. PCT/JP2019/002087, filed on Jan. 23, 2019.

(30) Foreign Application Priority Data

Jan. 24, 2018  (JP) .............................. JP2018-009667

(51) Int. Cl.
*G01S 7/03*  (2006.01)
*G01S 13/34*  (2006.01)
(Continued)

(52) U.S. Cl.
CPC .............. *G01S 7/032* (2013.01); *G01S 13/34* (2013.01); *H01Q 3/30* (2013.01); *H01Q 21/08* (2013.01);
(Continued)

(58) Field of Classification Search
CPC ........ G01S 7/032; G01S 13/34; G01S 13/343; G01S 13/931; G01S 13/42; G01S 13/584;
(Continued)

(56) References Cited

U.S. PATENT DOCUMENTS 5,579,010 A * 11/1996 Iihoshi .................... G01S 7/295
342/70
5,724,666 A * 3/1998 Dent ...................... H01Q 21/08
455/562.1

(Continued)

FOREIGN PATENT DOCUMENTS

JP       2004-096676 A       3/2004
JP       2004096676 A *      3/2004
(Continued)

*Primary Examiner* — Vladimir Magloire
*Assistant Examiner* — Alexander L. Syrkin
(74) *Attorney, Agent, or Firm* — Maschoff Brennan

(57) ABSTRACT

A transmission antenna unit includes a plurality of transmission antennas, a reception antenna unit, and a processor. The plurality of transmission antennas that are arranged in a row along a predetermined array direction. The reception antenna unit includes a plurality of reception antennas that are arranged in a row along the array direction. The plurality of transmission antennas and the plurality of reception antennas form a virtual array in which a plurality of virtual reception antennas are arranged in a row along the array direction. The processor corrects a plurality of virtual reception signals by multiplying a virtual reception signal matrix by an inverse matrix of a reception mutual coupling matrix and an inverse matrix of a transmission mutual coupling matrix.

5 Claims, 16 Drawing Sheets

(51) Int. Cl.
   *H01Q 3/30*   (2006.01)
   *H01Q 21/08*   (2006.01)
   *G01S 13/931*   (2020.01)
   *H01Q 1/32*   (2006.01)

(52) U.S. Cl.
   CPC ........... *G01S 13/343* (2013.01); *G01S 13/931* (2013.01); *H01Q 1/3233* (2013.01)

(58) Field of Classification Search
   CPC ........ G01S 13/325; H01Q 3/30; H01Q 21/08; H01Q 1/3233; H04B 7/08
   USPC .................................................. 342/200, 20
   See application file for complete search history.

(56) References Cited

U.S. PATENT DOCUMENTS

| | | | | |
|---|---|---|---|---|
| 5,982,321 | A * | 11/1999 | Iihoshi | G01S 13/34 342/158 |
| 6,473,472 | B1 * | 10/2002 | Uchiki | H03M 13/45 375/341 |
| 6,606,058 | B1 * | 8/2003 | Bonek | H01Q 3/26 342/367 |
| 6,609,013 | B1 * | 8/2003 | Oh | H04B 7/0491 455/561 |
| 6,680,699 | B2 * | 1/2004 | Voyer | H04B 7/0848 342/378 |
| 6,711,124 | B2 * | 3/2004 | Khayrallah | H04B 7/0615 370/208 |
| 2012/0128100 | A1 | 5/2012 | Hasegawa | |
| 2016/0154091 | A1 * | 6/2016 | Yosoku | G01S 7/023 342/201 |
| 2017/0082730 | A1 * | 3/2017 | Kishigami | H01Q 21/061 |

FOREIGN PATENT DOCUMENTS

| | | | | |
|---|---|---|---|---|
| JP | 2008124595 | A | | 5/2008 |
| JP | 4320441 | B2 | | 6/2009 |
| JP | 2012109877 | A * | 6/2012 | ............... H03D 7/00 |
| JP | 2015117974 | A | | 6/2015 |
| JP | 2016102745 | A * | 6/2016 | ............ G01S 7/023 |
| JP | 2017-58359 | A | | 3/2017 |
| JP | 2017058359 | A * | 3/2017 | |
| KR | 10-2005-0087894 | A | | 9/2005 |
| KR | 20050087894 | A * | 9/2005 | |

* cited by examiner

WHEN NUMBER OF PHASES P = 4

FIG.12
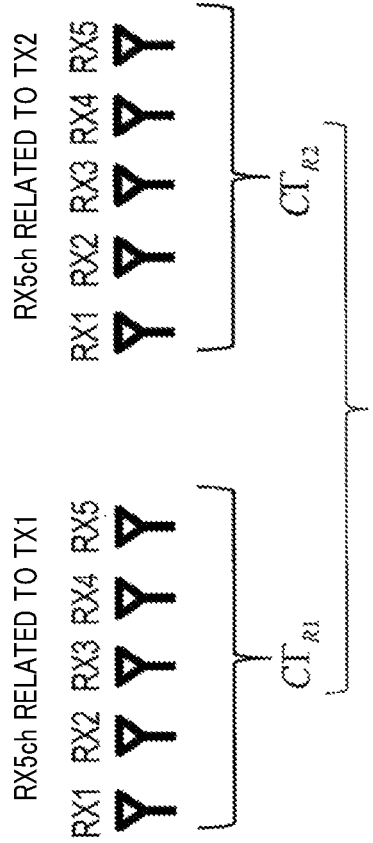
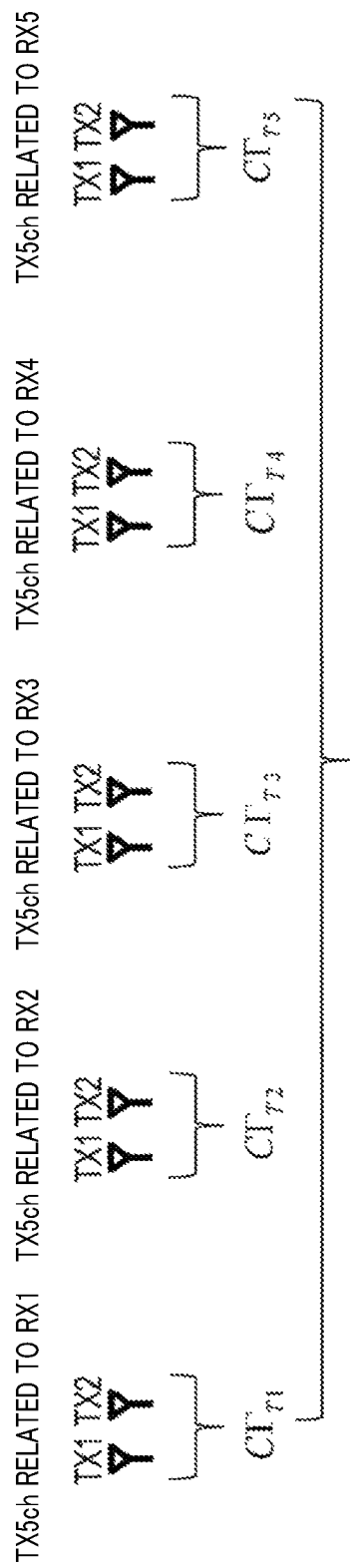

n : NUMBER OF SNAPSHOTS

FIG.14

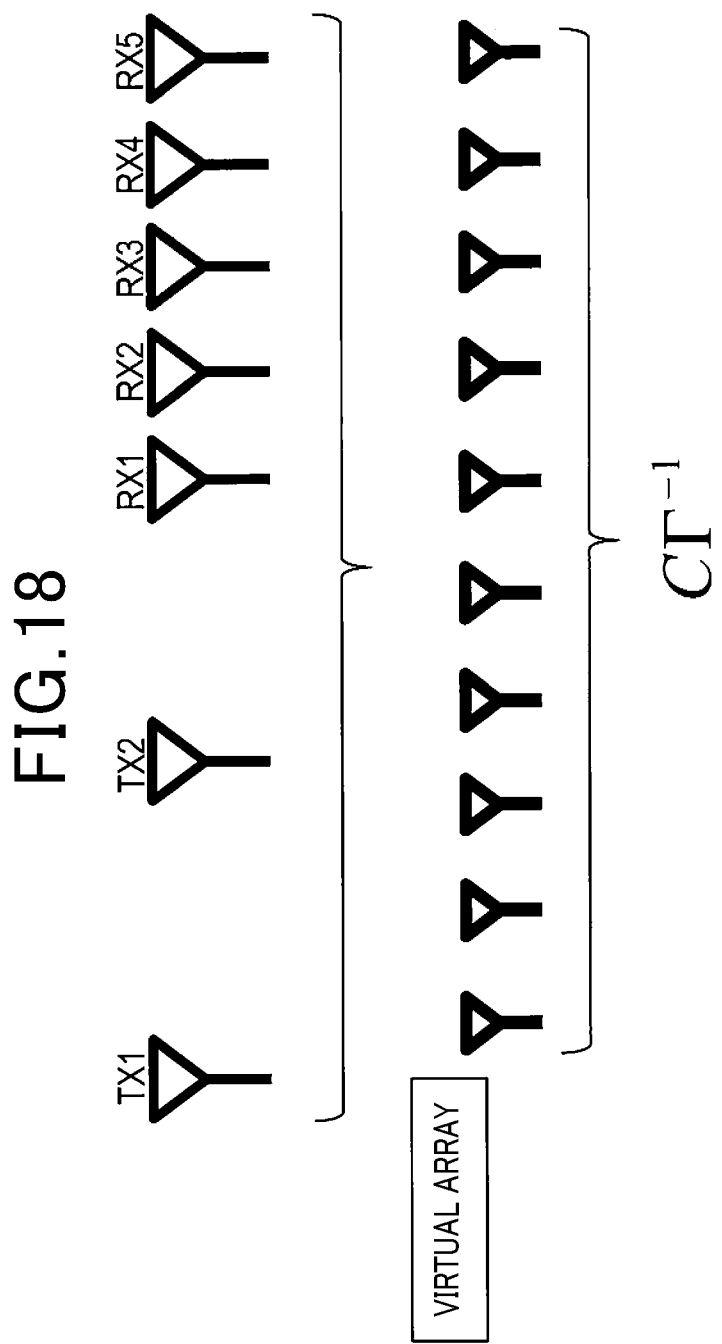

RADAR APPARATUS

CROSS-REFERENCE TO RELATED APPLICATIONS

The present application is a continuation application of International Application No. PCT/JP2019/002087, filed Jan. 23, 2019, which claims priority to Japanese Patent Application No. 2018-009667, filed Jan. 24, 2018. The contents of these applications are incorporated herein by reference in their entirety.

BACKGROUND

Technical Field

The present disclosure relates to a radar apparatus that detects an object by transmitting and receiving radio waves through a plurality of antennas.

Related Art

A periphery monitoring system by a millimeter-wave radar uses phase difference information regarding reception signals received by reception antennas when orientation estimation of a target is performed. In this system, when mutual coupling between reception antennas is significant, reception signals of the reception antennas become disturbed and phase information becomes inaccurate, and orientation estimation cannot be correctly performed.

SUMMARY

An aspect of the present disclosure provides a radar apparatus that includes a transmission antenna unit, a reception antenna unit, and a processor. The transmission antenna unit includes a plurality of transmission antennas that are arranged in a row along a predetermined array direction. The reception antenna unit includes a plurality of reception antennas that are arranged in a row along the array direction. The plurality of transmission antennas and the plurality of reception antennas form a virtual array in which a plurality of virtual reception antennas are arranged in a row along the array direction. The processor corrects a plurality of virtual reception signals by multiplying a virtual reception signal matrix by an inverse matrix of a reception mutual coupling matrix and an inverse matrix of a transmission mutual coupling matrix.

BRIEF DESCRIPTION OF THE DRAWINGS

In the accompanying drawings:

FIG. 12 is a diagram for explaining a method for calculating a reception CF correction term and a transmission CF correction term;

FIG. 14 is a diagram for explaining an equation $A\alpha=B$;

FIG. 18 is a diagram of a method for calculating a CF correction term.

DESCRIPTION OF THE EMBODIMENTS

Figure 1:
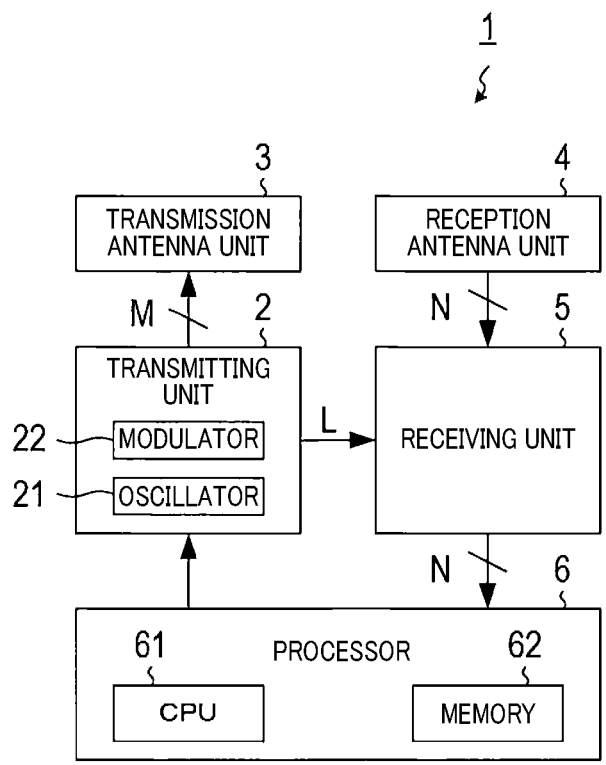
FIG. 1 is a block diagram of a configuration of a radar apparatus.

A periphery monitoring system by a millimeter-wave radar uses phase difference information regarding reception signals received by reception antennas when orientation estimation of a target is performed. In this system, when mutual coupling between reception antennas is significant, reception signals of the reception antennas become disturbed and phase information becomes inaccurate, and orientation estimation cannot be correctly performed.

To solve the above-described issue, Japanese Patent Publication No. 4320441 describes a method in which, in a typical, conventional SIMO millimeter-wave radar, a matrix of inter-element mutual couplings of antenna elements and gain/phase error is estimated, and correction of an array antenna is performed by reception signals being multiplied by the inter-element mutual coupling and error matrix. SIMO is an abbreviation of single-input multiple-output.

In recent years, numerous methods for reducing the size of a millimeter-wave radar through use of MIMO have been used. MIMO is an abbreviation of multiple-input multiple-output.

However, as a result of a detailed review by the inventor, an issue has been found in that, in the MIMO radar, reception signals become disturbed even as a result of mutual coupling between transmission antennas. Phase information may become inaccurate, and orientation estimation may not be correctly performed.

It is thus desired to improve detection accuracy regarding an orientation of an object in a MIMO radar.

A first exemplary embodiment provides a radar apparatus that includes a transmission antenna unit, an oscillator, a modulator, a reception antenna unit, and a processor.

The transmission antenna unit includes a plurality of transmission antennas that are arranged in a row along an array direction that is set in advance. The oscillator is configured to generate a common signal that is a continuous wave. The modulator is configured to generate a plurality of transmission signals that are inputted to the plurality of transmission antennas, by performing phase-shift keying in which a phase of a split signal is rotated at each repetition period set in advance, by a phase rotation amount that differs for each of a plurality of split signals generated by splitting the common signal into a same number of signals as the plurality of transmission antennas. The reception antenna unit includes a plurality of reception antennas that are arranged in a row along the array direction. The processor is configured to generate information related to an object that reflects a radiation wave from the transmission antenna unit based on a plurality of signal components corresponding to the plurality of transmission signals extracted from each of a plurality of reception signals received by the reception antenna unit.

In the radar apparatus, the plurality of transmission antennas and the plurality of reception antennas form a virtual array in which a plurality of virtual reception antennas are arranged in a row along the array direction. The processor includes an individual correcting unit that is configured to correct a plurality of virtual reception signals by multiplying a virtual reception signal matrix by at least an inverse matrix of a reception mutual coupling matrix and an inverse matrix of a transmission mutual coupling matrix. The virtual reception signal matrix indicates each of the plurality of virtual reception signals received by the plurality of virtual reception antennas. The reception mutual coupling matrix indicates mutual coupling among the plurality of reception antennas. The transmission mutual coupling matrix indicates mutual coupling among the plurality of transmission antennas.

The radar apparatus configured in this manner can calculate the virtual reception signals in which, in addition to effects of mutual coupling among the plurality of reception antennas, effects of the mutual coupling among the plurality of transmission antennas are also reduced. Detection accuracy regarding an orientation of an object can be improved.

A second exemplary embodiment provides a radar apparatus that includes a transmission antenna unit, an oscillator, a modulator, a reception antenna unit, and a processor. In this radar apparatus, the plurality of transmission antennas and the plurality of reception antennas form a virtual array in which a plurality of virtual reception antennas are arranged in a row along the array direction. The processor includes a collective correcting unit that is configured to correct the plurality of virtual reception signals by multiplying a virtual reception signal matrix by at least an inverse matrix of a virtual mutual coupling matrix that indicates mutual coupling among the plurality of virtual reception antennas.

The radar apparatus according to the other aspect of the present disclosure that is configured in this manner can achieve effects similar to those of the radar apparatus according to an aspect of the present disclosure.

First Embodiment

A first embodiment of the present disclosure will hereinafter be described with reference to the drawings.

A radar apparatus 1 according to the present embodiment is mounted in a vehicle and detects various objects that are present in the periphery of the vehicle. The radar apparatus 1 is a MIMO radar that simultaneously transmits and receives radio waves through a plurality of antennas.

As shown in FIG. 1, the radar apparatus 1 includes a transmitting unit 2, a transmission antenna unit 3, a reception antenna unit 4, a receiving unit 5, and a processor 6.

The transmission antenna unit 3 includes M transmission antennas. M is an integer of 2 or greater. The transmission antennas are arranged in a row along an array direction that is set in advance, at a first interval dT that is set in advance. According to the present embodiment, the array direction is a width direction of the vehicle.

The reception antenna unit 4 includes N reception antennas. N is an integer of 2 or greater. The reception antennas are arranged in a row along a direction that is the same as the array direction of the transmission antenna, at a second interval $d_R$ that differs from the first interval $d_T$.

Figure 2:
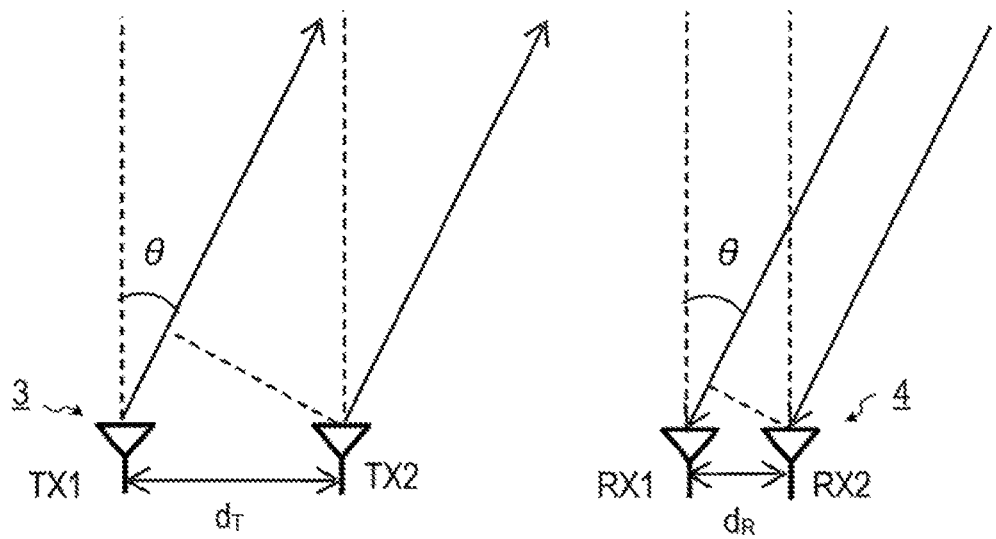
FIG. 2 is a diagram of relationships between transmission antennas and reception antennas, and an object.

Here, signals that are received by the reception antennas when M=2 and N=2 will be described. As shown in FIG. 2, an object that serves as a detection target is presumed to be present in a direction that is tilted by an angle θ in relation to a front direction of the transmission antenna unit 3 and the reception antenna unit 4. In addition, a reflection coefficient at the object is denoted by D. A phase change of a signal on a path from a transmission antenna TX1 to the object is denoted by $\alpha_T$. A phase change of a signal on a path from the object to a reception antenna RX1 is denoted by $\alpha_R$. Here, $\alpha_T$ and $\alpha_R$ are expressed by complex numbers.

In this case, a signal that is transmitted from the transmission antenna TX1 and received by the reception antenna RX1 is expressed by expression (1). A signal that is transmitted from the transmission antenna TX1 and received by a reception antenna RX2 is expressed by expression (2). A signal that is transmitted from a transmission antenna TX2 and received by the reception antenna RX1 is expressed by expression (3). A signal that is transmitted from the transmission antenna TX2 and received by the reception antenna RX2 is expressed by expression (4).

$$\alpha_T \cdot D \cdot \alpha_R \tag{1}$$

$$\alpha_T \cdot D \cdot \alpha_R \cdot \exp(jkd_R \sin \theta) \tag{2}$$

$$\alpha_T \cdot D \cdot \alpha_R \cdot \exp(jkd_T \sin \theta) \tag{3}$$

$$\alpha_T \cdot D \cdot \alpha_R \cdot \exp(jk(d_T+d_R)\sin \theta) \tag{4}$$

Figure 3:
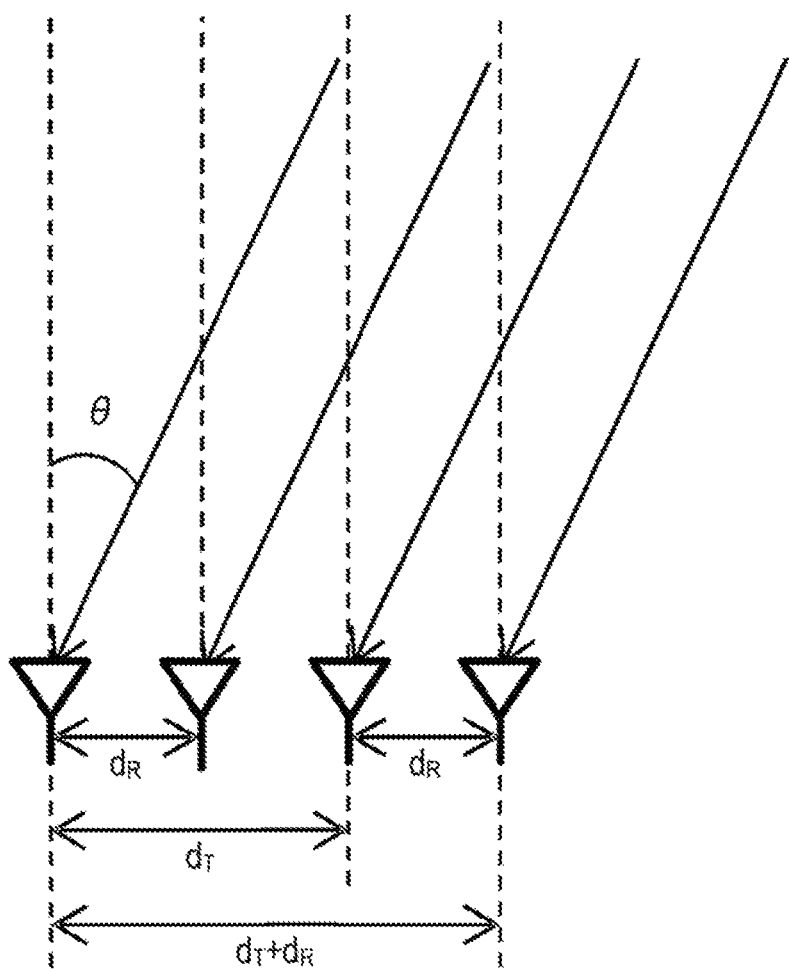
FIG. 3 is a diagram of an arrangement of reception antennas in a virtual array.

These expressions are equivalent to a case in which four reception antennas are arranged in positions in which distances from a reception antenna that serves as reference are respectively $d_R$, $d_T$, and $d_T+d_R$, as shown in FIG. 3. In FIG. 3, the reception antenna that is positioned furthest to the left serves as reference. Virtual reception antennas (referred to, hereafter, as virtual reception antennas) that are arranged in this manner are referred to as a virtual array.

In the MIMO radar, through use of the virtual array, an angular resolution that is equal to that when a single transmission antenna and M×N reception antennas are provided is obtained using M+N transmission antennas and reception antennas.

Figure 4:
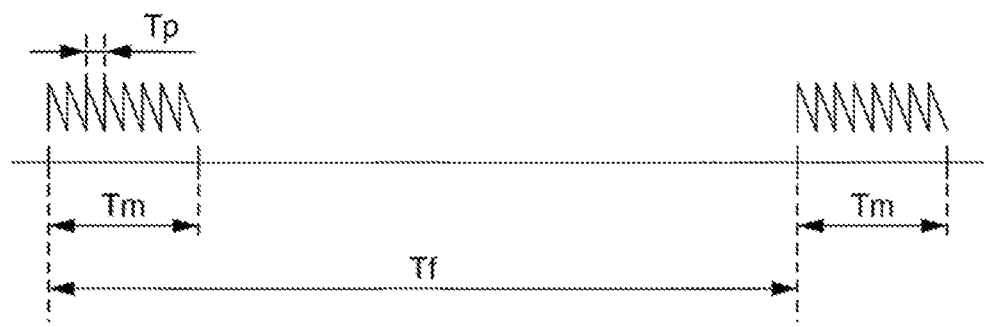
FIG. 4 is a diagram of a function of an oscillator.

As shown in FIG. 1, the transmitting unit 2 includes an oscillator 21 and a modulator 22. The oscillator 21 generates a common signal that is a continuous wave. The oscillator 21 supplies the generated common signal to the modulator 22 and also supplies the generated common signal to the receiving unit 5 as a local signal L. In addition, as shown in FIG. 4, the oscillator 21 repeatedly generates, at a repetition period Tp (such as 50 μs), a chirp signal of which a frequency continuously changes, during a measurement period Tm (such as 10 ms) at a head of each frame, a single frame being a measurement period Tf (such as 50 ms).

The oscillator 21 is configured to be capable of changing the measurement period Tf, the measurement period Tm, and the repetition period Tp as appropriate, based on a command from the processor 6. Here, a frequency width of the chirp signal that is changed during the repetition period is fixed regardless of the repetition period Tp. That is, the configuration is such that a change rate Δf of the frequency of the chirp signal changes as a result of the repetition period Tp being changed.

In addition, an allowable range of the repetition period Tp and an allowable range of the change rate Δf of the frequency of the chirp signal are set such that a frequency deviation that occurs based on a relative speed to an object is reduced to a negligible degree compared to a frequency deviation that occurs based on a distance to the object, when a beat signal that is generated by the transmission signal and the reception signal being mixed is analyzed.

The modulator 22 splits the common signal that is generated by the oscillator 21 and generates M split signals, the amount of which is the same as the number of transmission antennas belonging to the transmission antenna unit 3. The modulator 22 performs phase-shift keying in which, for each of the M split signals, the phase of the split signal is changed at each repetition period Tp. As a result, M transmission signals that are respectively supplied to the transmission antennas are generated. In the phase-shift keying, phase rotation amounts $\Delta\varphi$ of differing magnitudes are respectively set for the M split signals. The phase of split signal is rotated by the phase rotation amount $\Delta\varphi$ at each repetition period.

Figure 5:
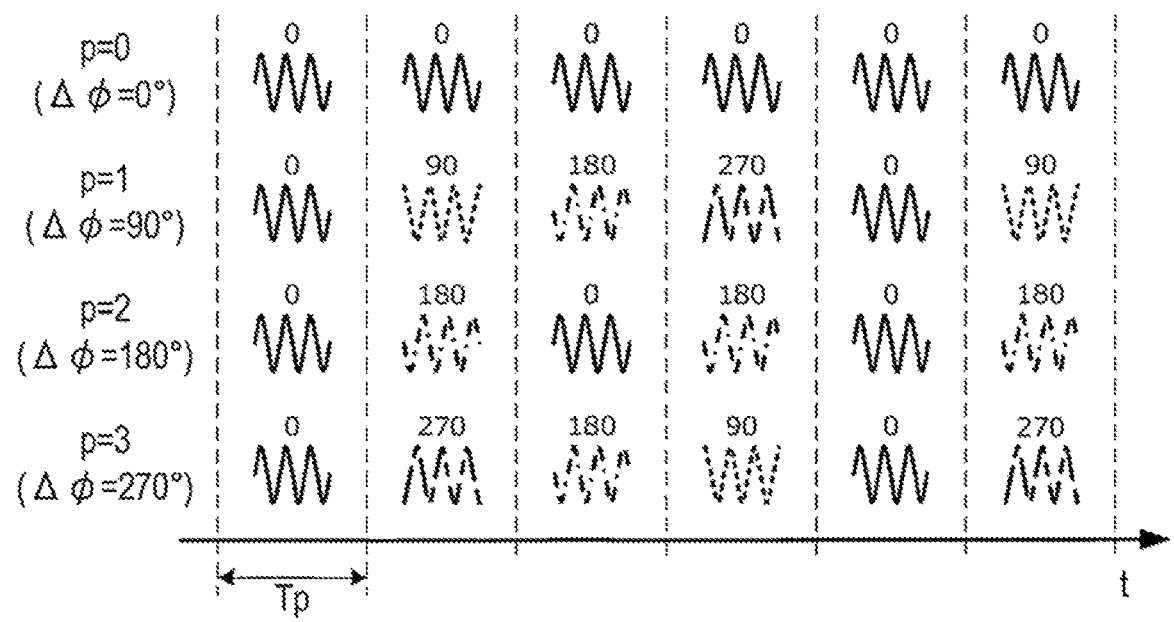
FIG. 5 is a diagram of an example of phase rotation amounts used for phase-shift keying in a modulator.

Here, a number of phases that are used in the phase-shift keying is P. P is an integer that is greater than M. In the modulator 22, P types of phase rotation amounts expressed by $\Delta\varphi=p\times360°/P$, where p=0, 1, 2, ..., P−1, are used. For example, when P=4, as shown in FIG. 5, $\Delta\varphi=0°$ when p=0. A phase difference of a transmission signal that is a signal after modulation in relation to a split signal (that is, the common signal) that is a signal before modulation is 0° at all repetition periods Tp. When p=1, $\Delta\varphi=90°$. The phase difference of the transmission signal in relation to the common signal is switched at each repetition period Tp, changing in order of 0°→90°→180°→270°→0° (the same applies hereafter). When p=2, $\Delta\varphi=180°$. The phase difference of the transmission signal in relation to the common signal is switched at each repetition period, changing in order of 0°→180°→0°→180°→0° (the same applies hereafter). When p=3, $\Delta\varphi=270°$. The phase difference of the transmission signal in relation to the common signal is switched at each repetition period, changing in order of 0°→270°→180°→90°→0° (the same applies hereafter).

Because the setting is such that P>M as described above, in the phase-shift keying, not all types of the P types of phase rotation amounts $\Delta\varphi$ are used. A portion thereof is used.

The modulator 22 is configured to be capable of changing, as appropriate, the setting of the number of phases P, selection of M types of phase rotation amounts used for the phase-shift keying among the P types of phase rotation amounts, and a setting regarding a corresponding relationship between the selected M types of phase rotation amounts and the M transmission antennas. The changes to the settings may be made based on a command from the processor 6. Alternatively, the changes to the settings may be automatically made. When the settings are automatically changed, the changes may be made based on a pattern that is determined in advance or at random.

As shown in FIG. 1, the receiving unit 5 generates the beat signal that is a difference signal with the local signal L, for each of the N reception signals outputted from the reception antennas belonging to the reception antenna unit 4, samples the generated beat signals, and supplies the sampled beat signals to the processor 6.

The processor 6 is an electronic control apparatus that is mainly configured by a known microcomputer that includes a central processor (CPU) 61, a memory 62, and the like. For example, the memory 62 is a read-only memory (ROM) or a random access memory (RAM). Various functions of the microcomputer are actualized by the CPU 61 running a program that is stored in a non-transitory computer-readable storage medium. In this example, the memory 62 corresponds to the non-transitory computer-readable storage medium in which the program is stored. In addition, a method corresponding to the program is performed as a result of the program being run. Here, some or all of the functions provided by the CPU 61 may be configured by hardware, such as by one or a plurality of integrated circuits (ICs). In addition, the processor 6 may be configured by one or a plurality of microcomputers.

Next, steps in an object detection process that is performed by the processor 6 will be described. The object detection process is a process that is repeatedly performed after the processor 6 is started.

Figure 6:
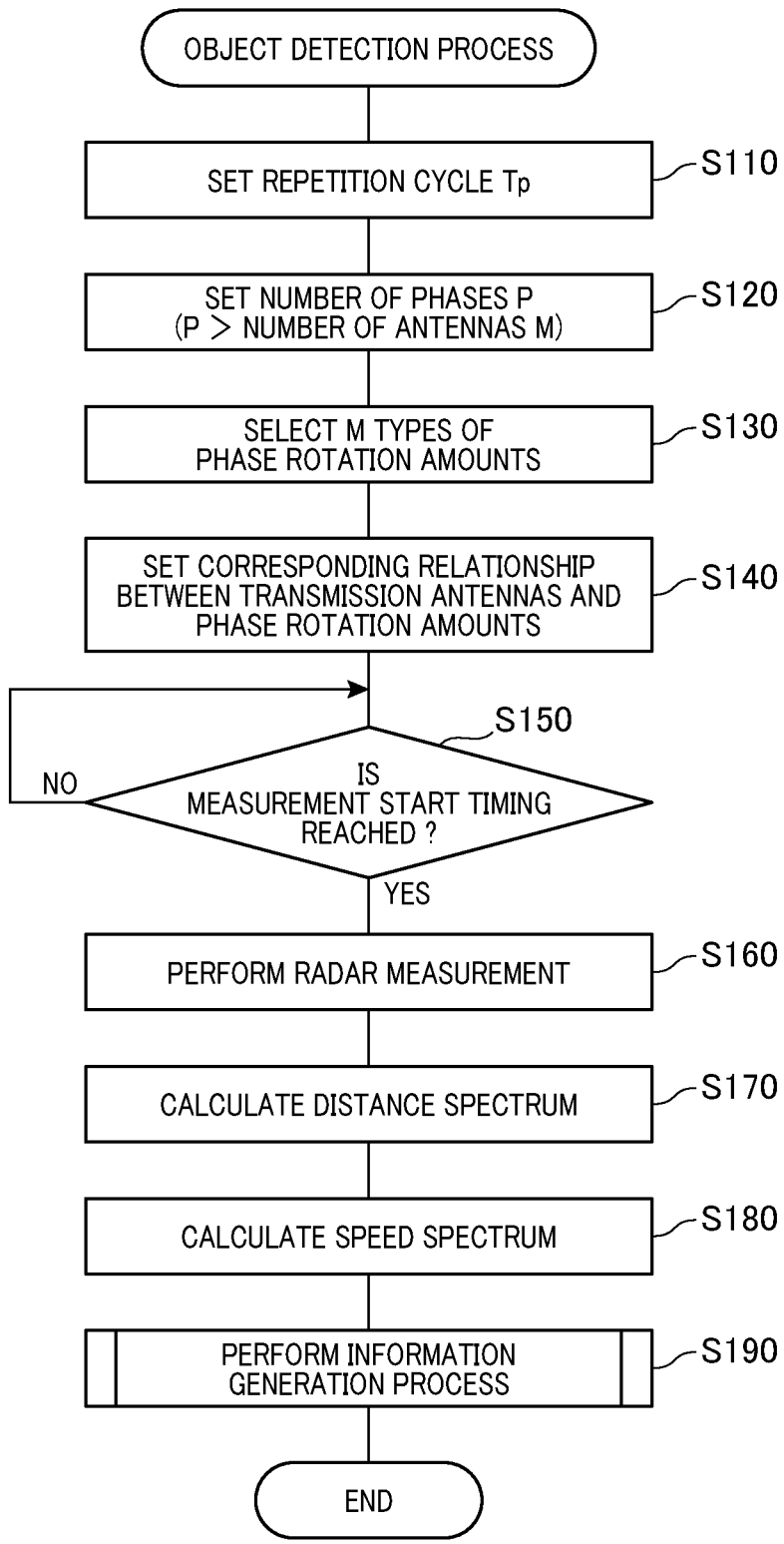
FIG. 6 is a flowchart of an object detection process.

When this object detection process is performed, as shown in FIG. 6, first, at S110, the processor 6 sets the repetition period Tp that is a parameter related to the common signal that is generated in the oscillator 21. As described above, when the repetition period is changed, the change rate $\Delta f$ of the frequency of the chirp signal changes. Here, the repetition period Tp may be a fixed value. Alternatively, the repetition period Tp may be set based on a pattern that is determined in advance each time the present process is performed, or by random selection from a plurality of types of values. In addition, at S110, the measurement period Tf and the measurement period Tm may be variably set as appropriate.

At S120, the processor 6 sets the number of phases P that is used for the phase-shift keying in the modulator 22. As the number of phases P, a value that is greater than the number of transmission antennas M is used. For example, P=M+1 may be set. In a manner similar to the repetition period Tp, the number of phases P may be a fixed value. Alternatively, the number of phases P may be set based on a pattern that is determined in advance each time the present process is performed, or by random selection from a plurality of types of values.

At S130, the processor 6 selects the M types of phase rotation amounts used for the phase-shift keying in the modulator 22, among the P types of phase rotation amounts determined by the number of phases P. The M types of phase rotation amounts are selected such that the rotation amounts are not evenly arranged over 360°, that is, such that the rotation amounts are unevenly arranged.

Specifically, when P and M do not have a common divisor, the phase rotation amounts can be arbitrarily selected. When P and M have a common divisor, the selection is required to be made with care such that arrangement intervals are not repeats of a same pattern.

Figure 7:
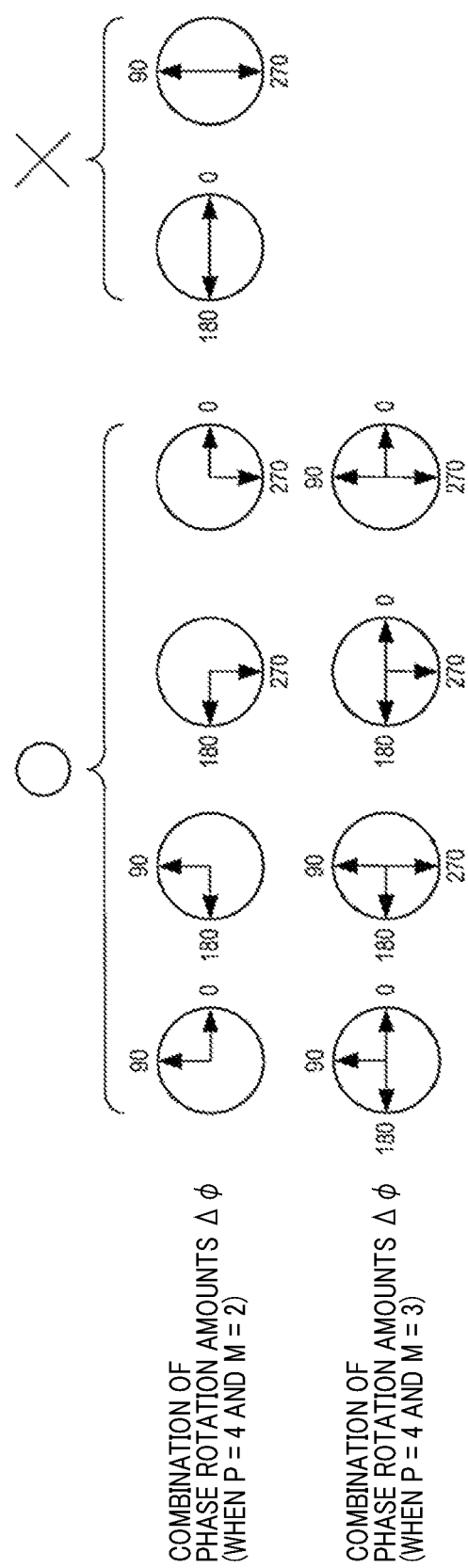
FIG. 7 is a diagram of selectable and unselectable combination patterns of phase rotation amounts.

For example, as shown in FIG. 7, when P=4 and M=2, (0°, 90°), (90°, 180°), (180°, 270°), and (270°, 0°) can be selected as combinations of phase rotation amounts. However, (0°, 180°) and (90°, 270°) cannot be selected. In addition, when P=4 and M=3, (0°, 90°, 180°), (90°, 180°, 270°), (180°, 270°, 0°), and (270°, 0°, 90°) can all be selected as combinations of phase rotation amounts. However, according to the present embodiment, a combination that includes $\Delta\varphi=0°$ is selected at all times.

Here, the selection of the phase rotation amounts may be fixed at all times. Alternatively, the selection of the phase rotation amounts may be switched based on a pattern that is determined in advance or at random, among the selectable combinations, each time the present process is performed.

At S140, the processor 6 sets a corresponding relationship between the M types of phase rotation amounts selected at S130 and the transmission antennas. For example, this correspondence may be assigned based on a rule that is set in advance or assigned at random. In addition, the correspondence may be fixed at all times. Alternatively, the correspondence may be switched based on a pattern that is determined in advance or at random, each time the present process is performed.

Figure 8:
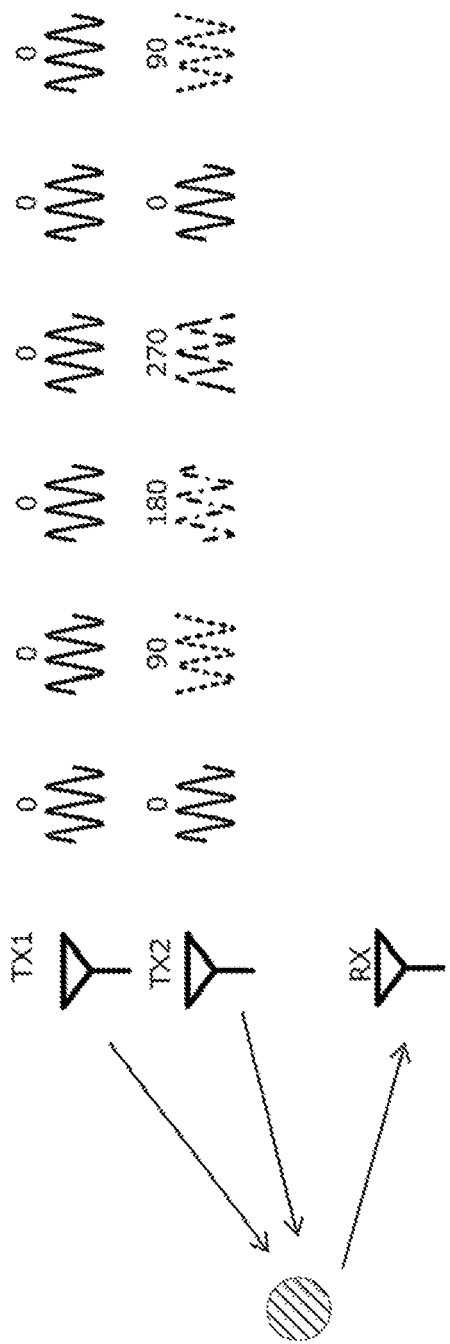
FIG. 8 is a diagram of an example of selection of phase rotation amounts.

FIG. 8 expresses an aspect in which the phases of the transmission signals that are respectively supplied to the transmission antennas TX1 and TX2 change, when P=4 and M=2, (0°, 90°) is selected as the combination of phase rotation amounts, and Δφ=0° is assigned to the transmission antenna TX1 and Δφ=90° is assigned to the transmission antenna TX2.

At S150, the processor 6 determines whether a measurement start timing is reached. When determined that the measurement start timing is not reached, the processor 6 waits by repeating the process at S150 until the measurement start timing is reached. When determined that the measurement start timing is reached, the processor 6 proceeds to S160. The measurement start timing is a timing at which a frame of which a length is determined by the measurement period Tf is switched.

Upon proceeding to S160, the processor 6 operates the transmitting unit 2 based on the setting results at S110 to S140 and performs radar measurement. Specifically, the processor 6 makes the transmitting unit 2 repeatedly transmit the chirp signal at each repetition period Tp during the measurement period Tm, and acquires a sampling result of the beat signals that are generated from the reception signals thereof. Hereafter, a number of chirp signals that are repeatedly transmitted during the measurement period Tm is K.

At S170, the processor 6 calculates K distance spectrums for each of the N reception antennas by performing frequency analysis on the sampling results of the beat signals acquired from the N reception antennas, for each reception antenna and for each chirp signal. In the distance spectrum, a peak appears at a frequency based on an amount of time required to move to and from an object that reflects a radiation wave transmitted from the transmission antenna (that is, a distance to the object).

At S180, the processor 6 calculates a velocity spectrum for each reception antenna using N×K distance spectrums calculated at S170. Specifically, the processor 6 extracts signals of a same frequency bin from the K distance spectrums related to a reception antenna of interest, and performs a frequency analysis process on the extracted signals in a time-axis direction. This process is performed on all frequencies bin (that is, distances).

In the velocity spectrum, when a relative speed to the object that reflects the radiation wave from the transmission antenna unit 3 is zero, a frequency that is based on the phase rotation amount allocated to each transmission antenna is extracted as a Doppler frequency. That is, a frequency of a signal component corresponding to Δφ=0° is 0 Hz.

Figure 9:
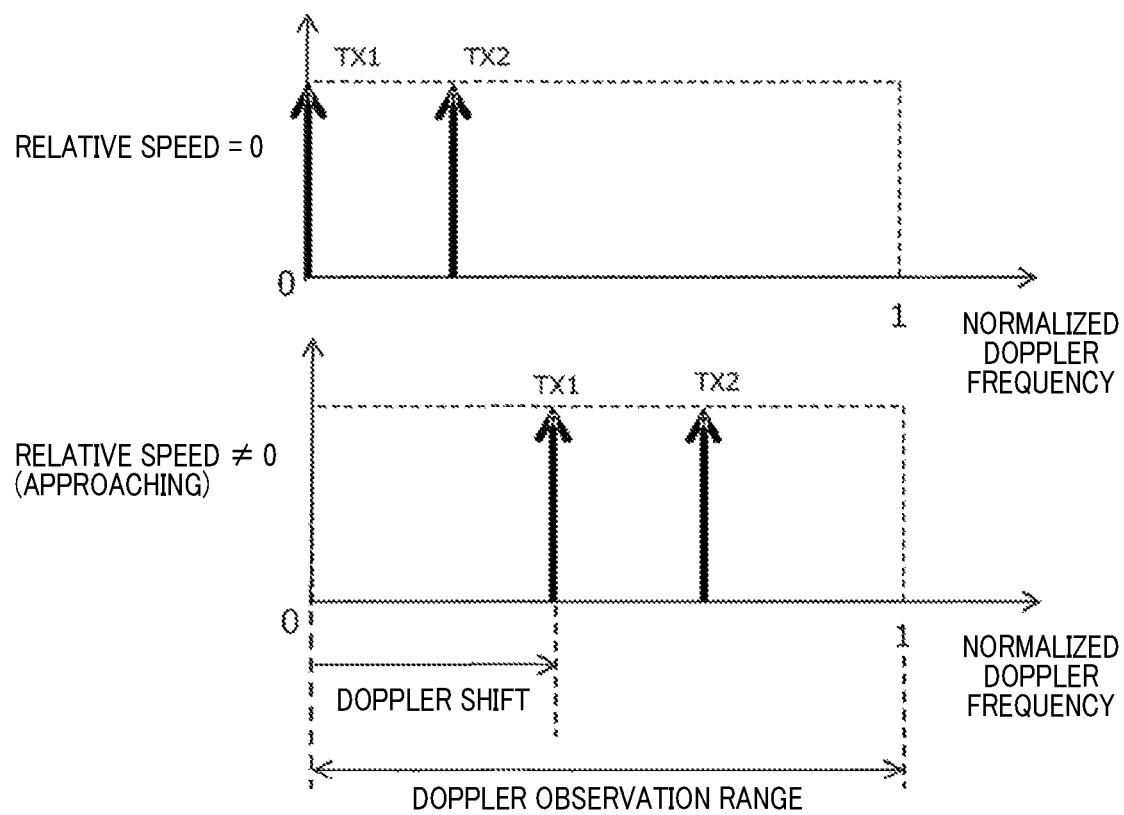
FIG. 9 is a diagram of an example of a same-object peak group that appears on a velocity spectrum.

Here, a range over which the Doppler frequency is observed (hereafter, a Doppler observation range) is determined by the repetition period Tp. In addition, as shown in FIG. 9, the Doppler frequency is detected at M points among points dividing the Doppler observation range into P. In FIG. 9, an upper limit of the Doppler observation range is normalized at 1.

In addition, in the velocity spectrum, when a relative speed to the object is present, the M Doppler frequencies shift by a magnitude based on the relative speed, and folding of the frequency occurs based on a magnitude of the relative speed.

Based on the calculation results at S170 and S180, a two-dimensional spectrum (hereafter, a reception spectrum) that expresses a distance and a relative speed to an object that reflects a radar wave is generated for each reception antenna.

As shown in FIG. 6, at S190, the processor 6 performs an information generation process in which the distance and the relative speed to the object that reflects the radar wave, and an orientation at which the object is present are calculated using the reception spectrum for each reception antenna. The processor 6 ends the object detection process.

Next, steps in the information generation process performed at S190 will be described.

Figure 10:
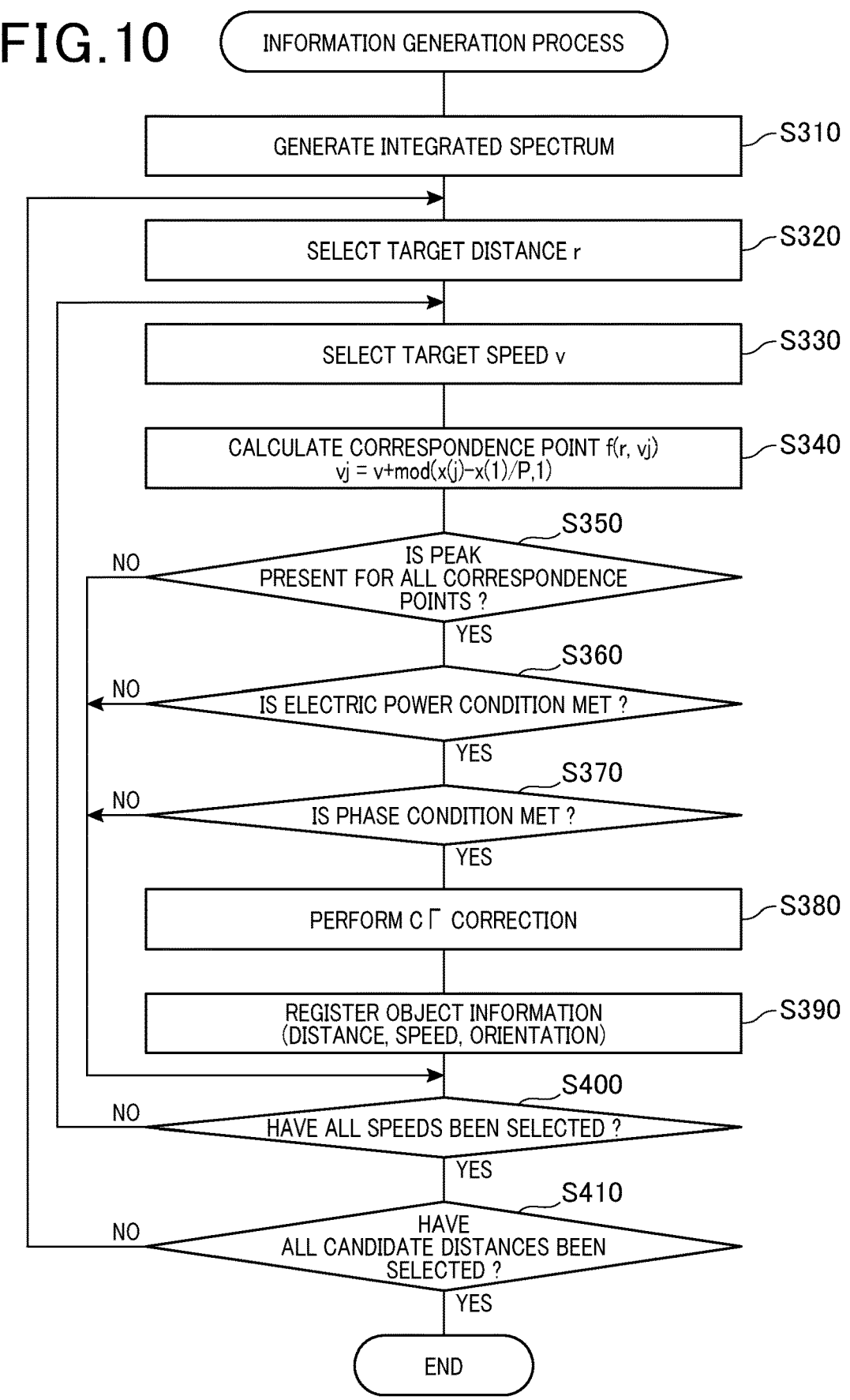
FIG. 10 is a flowchart of an information generation process according to a first embodiment.

When the information generation process is performed, as shown in FIG. 10, first, at S310, the processor 6 performs incoherent integration of the N reception spectrums generated for the reception antennas at S180 and calculates a single integrated spectrum g(r, v). With the reception spectrum for each reception antenna expressed by s(r, v, Rch), the integrated spectrum g(r, v) is calculated using expression (5). r denotes distance, v denotes a normalized Doppler speed of which a speed corresponding to an upper limit frequency of the Doppler observation range is 1, and Rch is a number that identifies the reception antenna.

$$g(r, v) = \sum_{Rch=1}^{N} |s(r, v, Rch)|^2. \tag{5}$$

At S320, the processor 6 selects, as a target distance r, a distance that is not yet selected as a subject for processing at S330 to S390, below, among candidate distances. The candidate distances are distances at which M peaks or more that have a strength that is equal to or greater than a threshold set in advance are detected on the integrated spectrum.

At S330, the processor 6 selects, as a target speed v, a speed that corresponds to a peak that is not yet selected as a processing subject at S340 to S370, below, among a plurality of peaks that are detected at the target distance r selected at S320. Here, the speed is selected in order from lowest.

At S340, the processor 6 calculates M−1 correspondence points (r, vj), where j=2 to M, at which a peak that corresponds to another phase rotation amount is estimated to be present, based on expression (6), under an assumption that the peak of the target speed v is a peak that corresponds to the phase rotation amount Δφ=0°. x(j) is a phase rotation amount other than Δφ=0° selected at S130. v and vj are normalized Doppler frequencies and are values from 0 to 1. mod(a, m) denotes a remainder after a is divided by m.

$$v_j = v + \mathrm{mod}(x(j) - x(1)/P, 1) \tag{6}$$

At S350, the processor 6 determines whether a peak (that is, a secondary maximum point) is present on the integrated spectrum, regarding all correspondence points estimated at S340. When determined YES, the processor 6 proceeds to S360. When determined NO, the processor 6 proceeds to S400. Hereafter, the M peaks corresponding to the correspondence points are referred to as a candidate peak group.

Upon proceeding to S360, the processor 6 determines whether the candidate peak group meets an electric power condition. When determined YES, the processor 6 proceeds to S370. When determined NO, the processor 6 proceeds to S400. Here, as the electric power condition, a signal strength difference between peaks belonging to the candidate peak group being within an allowable range set in advance is used. This is based on knowledge that signal strengths of peaks that are based on reflected waves from a same object should all be similar.

Upon proceeding to S370, the processor 6 determines whether the candidate peak group meets a phase condition. When determined YES, the processor 6 proceeds to S380. When determined NO, the processor 6 proceeds to S400. Here, as the phase condition, a reception-channel phase difference between a reference reception channel and a reception channel other than the reference reception channel being calculated and a difference in this phase difference between candidate peaks being within an allowable range set in advance is used. This is based on an inter-reception phase difference between peaks arriving from a same direction all being similar in magnitude, based on knowledge that peaks that are based on reflected waves from the same object should all arrive from a same direction. Hereafter, the candidate peak group that is determined YES at S 370 is referred to as a same-object peak group.

Upon proceeding to S380, the processor 6 performs CF correction in a following manner. That is, from each of the N reception spectrums calculated for the reception antennas, the processor 6 extracts the M peaks corresponding to the same-object peak group. The extracted M×N peaks are considered to be reception signals from the M×N virtual reception antennas included in the virtual array. The CF correction is performed on the virtual reception signals.

Figure 11:
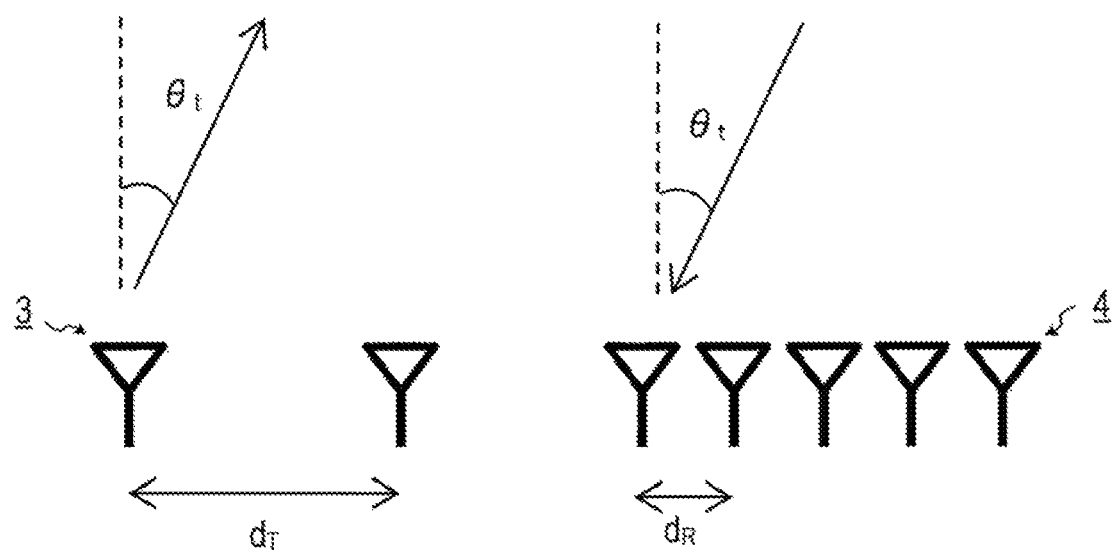
FIG. 11 is a diagram of an arrangement of transmission antennas and reception antennas, and an orientation of a detection target object.

For example, as shown in FIG. 11, the transmission antenna unit 3 includes two transmission antennas and the reception antenna unit 4 includes five reception antennas. The object to be detected is present in a direction that is tilted by an angle $\theta_t$ in relation to the front direction of the transmission antenna unit 3 and the reception antenna unit 4. In this case, a transmission mode vector is expressed by expression (7). A reception mode vector is expressed by expression (8). An inter-transmission coupling matrix is expressed by expression (9). An inter-reception coupling matrix is expressed by expression (10).

Furthermore, an ideal virtual reception signal is expressed by expression (11) using the transmission mode vector and the reception mode vector. In addition, a virtual reception signal including an inter-channel isolation error is expressed by expression (12).

Therefore, as shown in expression (13), the ideal virtual reception signal can be acquired by a virtual reception signal matrix that indicates virtual reception signals that include the inter-channel isolation error being multiplied by an inverse matrix of the inter-transmission coupling matrix and an inverse matrix of the inter-reception coupling matrix.

That is, at S380, the processor 6 acquires the virtual reception signals after the CF correction by multiplying the virtual reception signal matrix that indicates virtual reception signals from the M×N reception antennas included in the virtual array by the inverse matrix of the inter-transmission coupling matrix and an inverse matrix of the inter-reception coupling matrix, as shown in expression (13).

$$a_T(\theta) = \begin{bmatrix} 1 \\ e^{j2\pi \frac{d_R \sin\theta}{\lambda}} \end{bmatrix} \quad (7)$$

$$a_R(\theta) = \begin{bmatrix} 1 \\ e^{j2\pi \frac{d_R \sin\theta}{\lambda}} \\ \vdots \\ e^{j2\pi \frac{4d_R \sin\theta}{\lambda}} \end{bmatrix} \quad (8)$$

$$C\Gamma_{Tx} = \begin{bmatrix} 1 & \Delta_{12} \\ \Delta_{21} & 1 \end{bmatrix} \quad (9)$$

$$C\Gamma_{Rx} = \begin{bmatrix} 1 & \Delta_{12} & \Delta_{13} & \Delta_{14} & \Delta_{15} \\ \Delta_{21} & 1 & \Delta_{23} & \Delta_{24} & \Delta_{25} \\ \Delta_{31} & \Delta_{32} & 1 & \Delta_{34} & \Delta_{35} \\ \Delta_{41} & \Delta_{42} & \Delta_{43} & 1 & \Delta_{45} \\ \Delta_{51} & \Delta_{52} & \Delta_{53} & \Delta_{54} & 1 \end{bmatrix} \quad (10)$$

$$X(\theta_t) = a_T(\theta_t) a_R(\theta_t)^t \quad (11)$$

$$\hat{X}(\theta_t) = C\Gamma_{Tx} a_T(\theta_t) a_R(\theta_t)^t C\Gamma_{Rx}^t \quad (12)$$

$$X(\theta_t) = C\Gamma_{Tx}^{-1} \hat{X}(\theta_t)(C\Gamma_{Rx}^t)^{-1} \quad (13)$$

In addition, as shown in FIG. 10, at S390, the processor 6 registers a set of target distance r and target speed v as object information. Furthermore, the processor 6 calculates an orientation θ of the object by performing an orientation detection process, such as MUSIC or beam forming, using the virtual reception signals after the CF correction obtained at S380. MUSIC is an abbreviation for Multiple Signal Classification.

Here, the M peaks that are extracted as the same-object peak group from each reception signal of the N reception antennas correspond to the M×N virtual reception signals acquired from the virtual array.

Upon proceeding to S400, the processor 6 determines whether all of the peaks (that is, speeds) detected at the target distance r have been selected as the target speed v. When determined YES, the processor 6 proceeds to S410. When determined NO, the processor 6 proceeds to S330.

Upon proceeding to S410, the processor 6 determines whether all of the candidate distances have been selected as the target distance r. When determined YES, the processor 6 ends the information generation process. When determined NO, the processor 6 proceeds to S320.

Next, a method for generating the inter-reception coupling matrix and the inter-transmission coupling matrix will be described. Here, as shown in FIG. 12, as an example, a generation method in a case in which the transmission antenna unit 3 includes two transmission antennas TX1 and TX2, and the reception antenna unit 4 includes five reception antennas RX1, RX2, RX3, RX4, and RX5 will be described.

The inter-reception coupling matrix is denoted as $C\Gamma_{Rx}$. The inter-reception coupling matrix of five virtual reception antennas formed by the transmission antenna TX1 and the reception antennas RX1 to RX5 is denoted as $C\Gamma_{R1}$. The inter-reception coupling matrix of five virtual reception antennas formed by the transmission antenna TX2 and the reception antennas RX1 to RX5 is denoted as $C\Gamma_{R2}$.

In this case, a reception CΓ correction term $C\Gamma_{Rx}^{-1}$ that is an inverse matrix of the inter-reception coupling matrix $C\Gamma_{Rx}$ is calculated by expression (14).

$$C\Gamma_{Rx}^{-1} = ((C\Gamma_{R1} + C\Gamma_{R2})/2)^{-1} \quad (14)$$

In addition, the inter-transmission coupling matrix is denoted as $C\Gamma_{Tx}$. The inter-transmission coupling matrix of two virtual reception antennas formed by the reception antenna RX1 and the transmission antennas TX1 and TX2 is denoted as $C\Gamma_{T1}$. In a similar manner, the inter-transmission coupling matrices of two virtual reception antennas formed by the reception antennas RX2, RX3, RX4, and RX5 and the transmission antennas TX1 and TX2 are respectively denoted as $C\Gamma_{T2}$, $C\Gamma_{T3}$, $C\Gamma_{T4}$, and $C\Gamma_{T5}$.

In this case, a transmission CΓ correction term $CΓ_{Tx}^{-1}$ that is an inverse matrix of the inter-transmission coupling matrix $CΓ_{Tx}$ is calculated by expression (15).

$$CΓ_{Tx}^{-1}=((CΓ_{T1}+CΓ_{T2}+CΓ_{T3}+CΓ_{T4}+CΓ_{T5})/5)^{-1} \quad (15)$$

Next, a method for generating the inter-reception coupling matrices $CΓ_{R1}$ and $CΓ_{R2}$ of the virtual reception antennas will be described. Here, the inter-transmission coupling matrices $CΓ_{T1}$, $CΓ_{T2}$, $CΓ_{T3}$, $CΓ_{T4}$, and $CΓ_{T5}$ of the virtual reception antennas are also generated by a method similar to that of the inter-reception coupling matrices $CΓ_{R1}$ and $CΓ_{R2}$.

A signal that is actually inputted to an antenna is not an ideal signal but, rather, a signal that includes an error of some kind. As factors for errors, inter-element mutual coupling, variations in antenna element characteristics (such as amplitude and phase), element position error, a scatterer near the antenna, thermal noise, and the like can be given.

Among the factors described above, the main factors for errors in a high SN environment are considered to be inter-element mutual coupling and variations in antenna element characteristics.

When the main factors for errors are inter-element mutual coupling and variations in antenna element characteristics, the reception signals that are actually received can be modelized by expression (16). In expression (16), X denotes an actual reception signal.) $X_{ideal}$ denotes an ideal reception signal. C denotes a matrix of inter-element mutual coupling (hereafter, an inter-element mutual coupling matrix). Γ denotes a matrix of antenna element characteristics (hereafter, an element characteristics matrix).

Therefore, should the matrices C and Γ be able to be estimated in advance, as shown in expression (17), the reception signals can be corrected by the inverse matrices of the estimated matrices C and Γ being multiplied. This is the so-called CΓ correction.

$$X=CΓ*X_{ideal} \quad (16)$$

$$X_{ideal}=(CΓ)^{-1}*X \quad (17)$$

The inter-element mutual coupling matrix C and the element characteristics matrix Γ in a case in which the number of virtual reception antennas is five are respectively expressed by expression (18) and expression (19). Therefore, a product of the inter-element mutual coupling matrix C and the element characteristics matrix Γ is expressed by expression (20). In expression (20), as a result of $c_{33γ3}=1$, among twenty-five elements $α_{11}$ to $α_{55}$ configuring the matrix CΓ twenty-four elements excluding $α_{33}$ are unknown numbers.

$$C = \begin{pmatrix} c_{11} & c_{12} & c_{13} & c_{14} & c_{15} \\ c_{21} & c_{22} & c_{23} & c_{24} & c_{25} \\ c_{31} & c_{32} & c_{33} & c_{34} & c_{35} \\ c_{41} & c_{42} & c_{43} & c_{44} & c_{45} \\ c_{51} & c_{52} & c_{53} & c_{54} & c_{55} \end{pmatrix} \quad (18)$$

$$Γ = \begin{pmatrix} γ_1 & 0 & 0 & 0 & 0 \\ 0 & γ_2 & 0 & 0 & 0 \\ 0 & 0 & γ_3 & 0 & 0 \\ 0 & 0 & 0 & γ_4 & 0 \\ 0 & 0 & 0 & 0 & γ_5 \end{pmatrix} \quad (19)$$

$$CΓ = \begin{pmatrix} c_{11}γ_1 & c_{12}γ_2 & c_{13}γ_3 & c_{14}γ_4 & c_{15}γ_5 \\ c_{21}γ_1 & c_{22}γ_2 & c_{23}γ_3 & c_{24}γ_4 & c_{25}γ_5 \\ c_{31}γ_1 & c_{32}γ_2 & c_{33}γ_3 & c_{34}γ_4 & c_{35}γ_5 \\ c_{41}γ_1 & c_{42}γ_2 & c_{43}γ_3 & c_{44}γ_4 & c_{45}γ_5 \\ c_{51}γ_1 & c_{52}γ_2 & c_{53}γ_3 & c_{54}γ_4 & c_{55}γ_5 \end{pmatrix} = \quad (20)$$

$$\begin{pmatrix} α_{11} & α_{12} & α_{13} & α_{14} & α_{15} \\ α_{21} & α_{22} & α_{23} & α_{24} & α_{25} \\ α_{31} & α_{32} & 1 & α_{34} & α_{35} \\ α_{41} & α_{42} & α_{43} & α_{44} & α_{45} \\ α_{51} & α_{52} & α_{53} & α_{54} & α_{55} \end{pmatrix}$$

Figure 13:
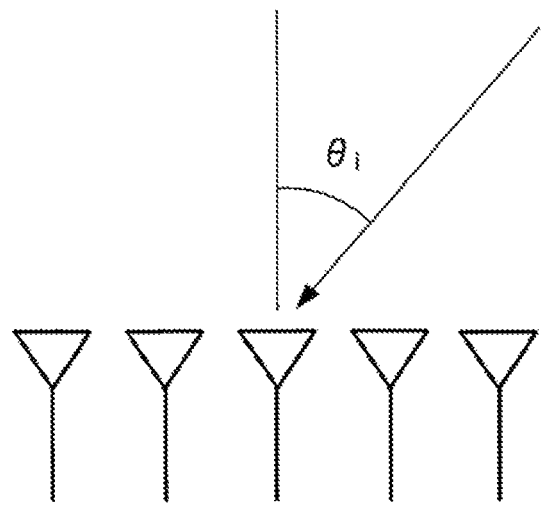
FIG. 13 is a diagram of a reception signal matrix.

As shown in FIG. 13, when a matrix that indicates reception signals that are incident at an orientation $θ_i$ and received by five reception antennas is a reception signal matrix $X_i$, the reception signal matrix $X_i$ and a correlation matrix $R_i$ are respectively expressed by expression (21) and expression (22).

$$X_i = CΓa(θ_i)s_i + n_i \quad (21)$$

$$R_i = E[X_iX_i^H] = \sum_{j=1}^{5} λ_j^{(i)} e_j^{(i)} e_j^{(i)H} \quad (22)$$

$a(θ_i)$: Mode vector of $θ_i$ (ideal vector)
$s_i$: Signal vector
$n_i$: Noise vector
$λ_j^{(i)}$: Eigenvalue of correlation matrix $R_i$
$e_j^{(i)}$: Eigenvector of correlation matrix $R_i$ When focus is placed on a noise subspace, a relationship shown in expression (23) is established. As a result of this relationship, expression (24) is established.

$$\{CΓa(θ_i)\} \perp \{e_2^{(i)}, \ldots, e_5^{(i)}\} \quad (23)$$

$$e_k^{(i)H}(CΓa(θ_i))=0 \quad (k=2, \ldots, 5) \quad (24)$$

Therefore, a relationship shown in expression (25) is established between the mode vector $A(θ_i)$ corresponding to the orientation $θ_i$ and the eigenvector $E_n(θ_i)$ of the noise subspace at the orientation $θ_i$. Here, the mode vector $A(θ_i)$ is expressed by expression (26) and the eigenvector $E_n(θ_i)$ is expressed by expression (27).

$$E_n(θ_i)^H \times (CΓ \times A(θ_t)) = 0 \quad (25)$$

$$A(θ_i) = (a_1(θ_i)\, a_2(θ_i)\, a_3(θ_i)\, a_4(θ_i)\, a_5(θ_i)) \quad (26)$$

$$E_n(θ_i) = \quad (27)$$

$$(E_2(θ_i)\, E_3(θ_i)\, E_4(θ_i)\, E_5(θ_i)) = \begin{pmatrix} e_{12}(θ_i) & e_{13}(θ_i) & e_{14}(θ_i) & e_{15}(θ_i) \\ e_{22}(θ_i) & e_{23}(θ_i) & e_{24}(θ_i) & e_{25}(θ_i) \\ e_{32}(θ_i) & e_{33}(θ_i) & e_{34}(θ_i) & e_{35}(θ_i) \\ e_{42}(θ_i) & e_{43}(θ_i) & e_{44}(θ_i) & e_{45}(θ_i) \\ e_{52}(θ_i) & e_{53}(θ_i) & e_{54}(θ_i) & e_{55}(θ_i) \end{pmatrix}$$

In addition, when expression (26) and expression (27) are substituted into expression (25), expression (28) is obtained. Furthermore, when expression (28) is expanded, expression (29) is obtained.

$$\begin{pmatrix} e_{12}(\theta_i)^* & e_{22}(\theta_i)^* & e_{32}(\theta_i)^* & e_{42}(\theta_i)^* & e_{52}(\theta_i)^* \\ e_{13}(\theta_i)^* & e_{23}(\theta_i)^* & e_{33}(\theta_i)^* & e_{43}(\theta_i)^* & e_{53}(\theta_i)^* \\ e_{14}(\theta_i)^* & e_{24}(\theta_i)^* & e_{34}(\theta_i)^* & e_{44}(\theta_i)^* & e_{54}(\theta_i)^* \\ e_{15}(\theta_i)^* & e_{25}(\theta_i)^* & e_{35}(\theta_i)^* & e_{45}(\theta_i)^* & e_{55}(\theta_i)^* \end{pmatrix} \quad (28)$$

$$\begin{pmatrix} \alpha_{11} & \alpha_{12} & \alpha_{13} & \alpha_{14} & \alpha_{15} \\ \alpha_{21} & \alpha_{22} & \alpha_{23} & \alpha_{24} & \alpha_{25} \\ \alpha_{31} & \alpha_{32} & 1 & \alpha_{34} & \alpha_{35} \\ \alpha_{41} & \alpha_{42} & \alpha_{43} & \alpha_{44} & \alpha_{45} \\ \alpha_{51} & \alpha_{52} & \alpha_{53} & \alpha_{54} & \alpha_{55} \end{pmatrix} \begin{pmatrix} a_1(\theta_i) \\ a_2(\theta_i) \\ a_3(\theta_i) \\ a_4(\theta_i) \\ a_5(\theta_i) \end{pmatrix} = 0$$

$$a_1(\theta_i)e_{1k}(\theta_i)^*\alpha_{11} + a_1(\theta_i)e_{2k}(\theta_i)^*\alpha_{12} + \qquad (29)$$
$$a_1(\theta_i)e_{3k}(\theta_i)^*\alpha_{13} + a_1(\theta_i)e_{4k}(\theta_i)^*\alpha_{14} +$$
$$a_1(\theta_i)e_{5k}(\theta_i)^*\alpha_{15} + a_2(\theta_i)e_{1k}(\theta_i)^*\alpha_{21} + a_2(\theta_i)e_{2k}(\theta_i)^*\alpha_{22} +$$
$$a_2(\theta_i)e_{3k}(\theta_i)^*\alpha_{23} + a_2(\theta_i)e_{4k}(\theta_i)^*\alpha_{24} + a_2(\theta_i)e_{5k}(\theta_i)^*\alpha_{25} +$$
$$a_3(\theta_i)e_{1k}(\theta_i)^*\alpha_{31} + a_3(\theta_i)e_{2k}(\theta_i)^*\alpha_{32} + a_3(\theta_i)e_{4k}(\theta_i)^*\alpha_{34} +$$
$$a_3(\theta_i)e_{5k}(\theta_i)^*\alpha_{35} + a_4(\theta_i)e_{1k}(\theta_i)^*\alpha_{41} + a_4(\theta_i)e_{2k}(\theta_i)^*\alpha_{42} +$$
$$a_4(\theta_i)e_{3k}(\theta_i)^*\alpha_{43} + a_4(\theta_i)e_{4k}(\theta_i)^*\alpha_{44} + a_4(\theta_i)e_{5k}(\theta_i)^*\alpha_{45} +$$
$$a_5(\theta_i)e_{1k}(\theta_i)^*\alpha_{51} + a_5(\theta_i)e_{2k}(\theta_i)^*\alpha_{52} + a_5(\theta_i)e_{3k}(\theta_i)^*\alpha_{53} +$$
$$a_5(\theta_i)e_{4k}(\theta_i)^*\alpha_{54} + a_5(\theta_i)e_{5k}(\theta_i)^*\alpha_{55} = -a_3(\theta_i)e_{3k}(\theta_i)^*$$
$$(k = 2, \ldots, 5)$$

That is, four simultaneous equations can be generated for a single orientation. For the simultaneous equations to have an obvious solution, an unknown number or more of simultaneous equations that are independent of each other are required. According to the present embodiment, the unknown number is 24. Therefore, a number of orientations J×4≥24 is required to be met. That is, the number of orientations J that is six or greater is required. Therefore, 24 or more simultaneous equations are required to be generated by actual reception signals being measured at six or more orientations $\theta_i$.

Figure 14:
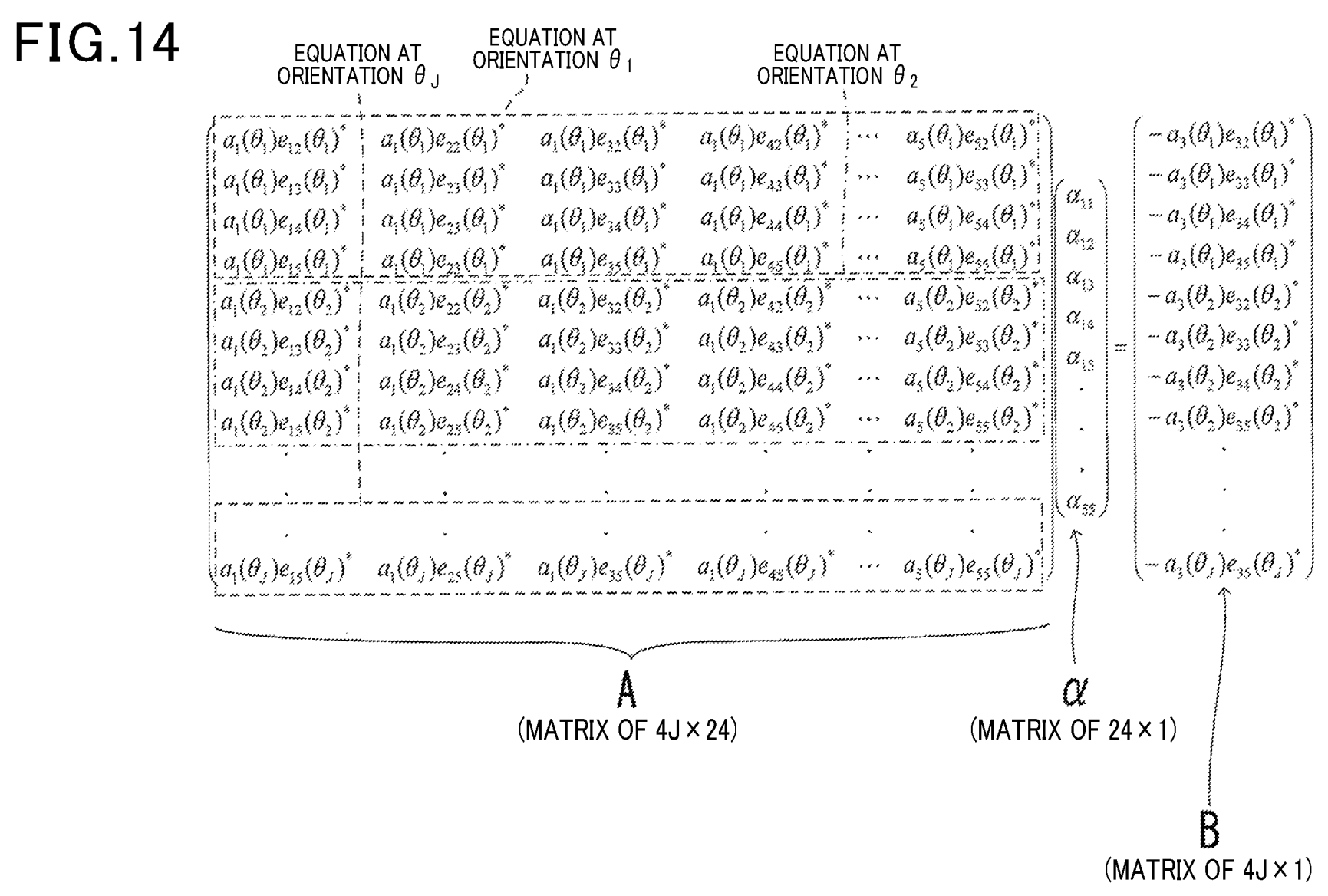

In addition, elements $\alpha_{11}$ to $\alpha_{55}$ of $\alpha$ can be determined by an equation A$\alpha$=B shown in FIG. 14 being solved through use of a least squares method. As a result, estimation of the matrix CΓ is completed.

The radar apparatus 1 that is configured in this manner includes the transmission antenna unit 3, the oscillator 21, the modulator 22, the reception antenna unit 4, and the processor 6.

The transmission antenna unit 3 includes M transmission antennas that are arranged in a row along an array direction that is set in advance. The oscillator 21 generates a common signal that is a continuous wave. The modulator 22 generates M transmission signals that are inputted to a plurality of transmission antennas by performing phase-shift keying in which a phase of a split signal is rotated at each repetition period Tp set in advance, at a phase rotation amount that differs for each of M split signals generated by splitting the common signal into a same number of signals as the M transmission antennas. The reception antenna unit 4 includes N reception antennas that are arranged in a row along the array direction. The processor 6 generates object information related to an object that reflects a radiation wave from the transmission antenna unit 3, based on a plurality of signal components corresponding to M transmission signals extracted from each of N reception signals received by the reception antenna unit 4.

In addition, in the radar apparatus 1, a virtual array in which a plurality of virtual reception antennas are arranged in a row along the array direction is formed by the M transmission antennas and the N reception antennas. In addition, the processor 6 corrects the M×N virtual reception antennas by multiplying a virtual reception signal matrix by the inverse matrix of an inter-reception coupling matrix and the inverse matrix of an inter-transmission coupling matrix.

As a result, the radar apparatus 1 can calculate the virtual reception signals in which, in addition to the effects of mutual coupling among the N reception antennas, the effects of the mutual coupling among the M transmission antennas are also reduced. Detection accuracy regarding the orientation of the object can be improved.

Figure 15:
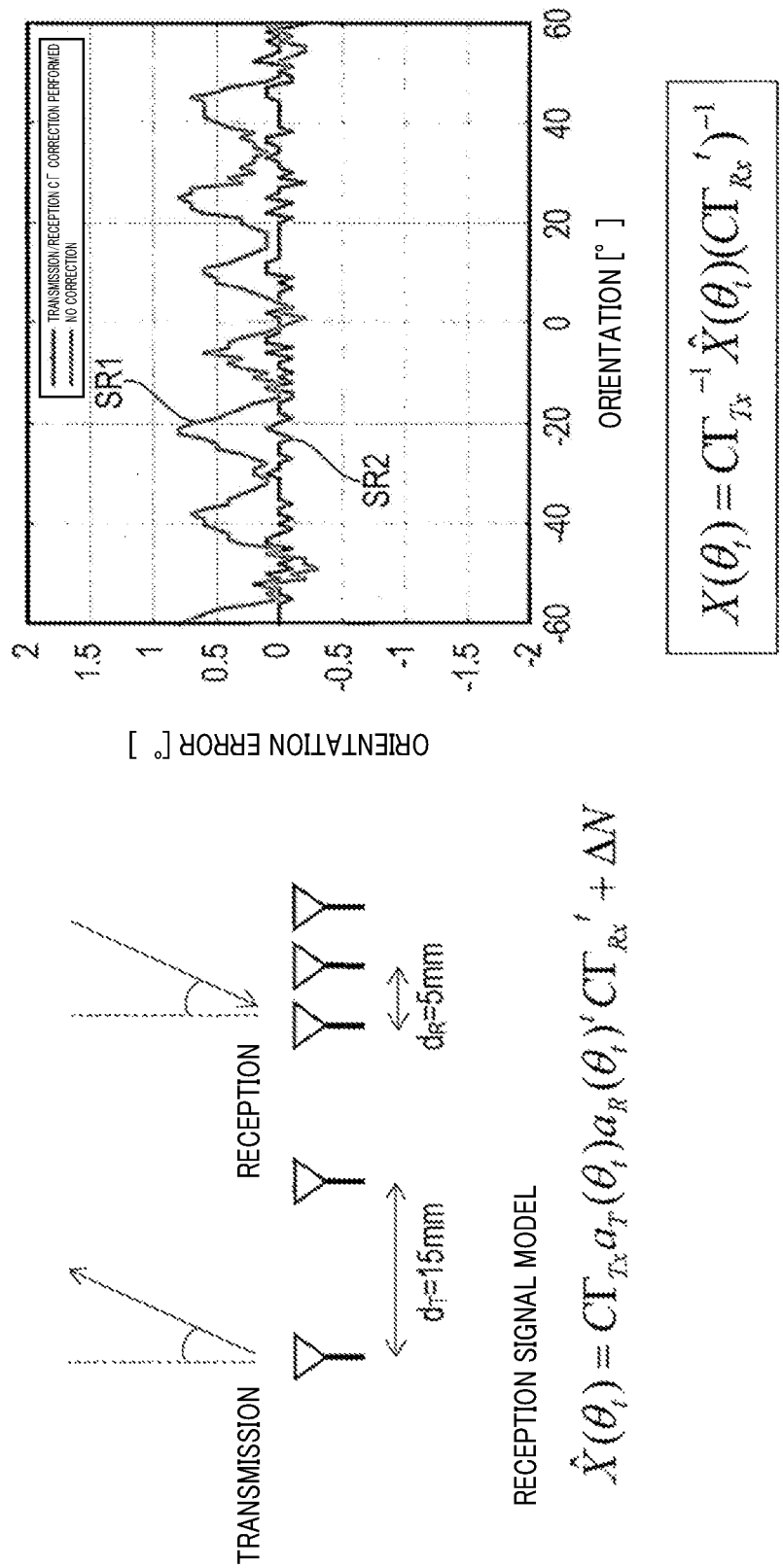
FIG. 15 is a diagram of first simulation results.

FIG. 15 shows first simulation results indicating a relationship between detected orientation and orientation error, in which results when correction is not performed and results when correction using the inter-reception coupling matrix and the inter-transmission coupling matrix is performed are shown. As shown in FIG. 15, the simulation results are results of a simulation performed on the radar apparatus 1 in which two transmission antenna are arranged such that the first interval $d_T$ is 15 mm, and three reception antennas are arranged such that the second interval $d_R$ is 5 mm. Orientation-orientation error characteristics SR1 are the results when correction is not performed. Orientation-orientation error characteristics SR2 are the results when correction using the inter-reception coupling matrix and the inter-transmission coupling matrix is performed.

As a result of the correction using the inter-reception coupling matrix and the inter-transmission coupling matrix being performed, only thermal noise components remain. Components of inter-reception coupling and components of inter-transmission coupling are removed.

Figure 16:
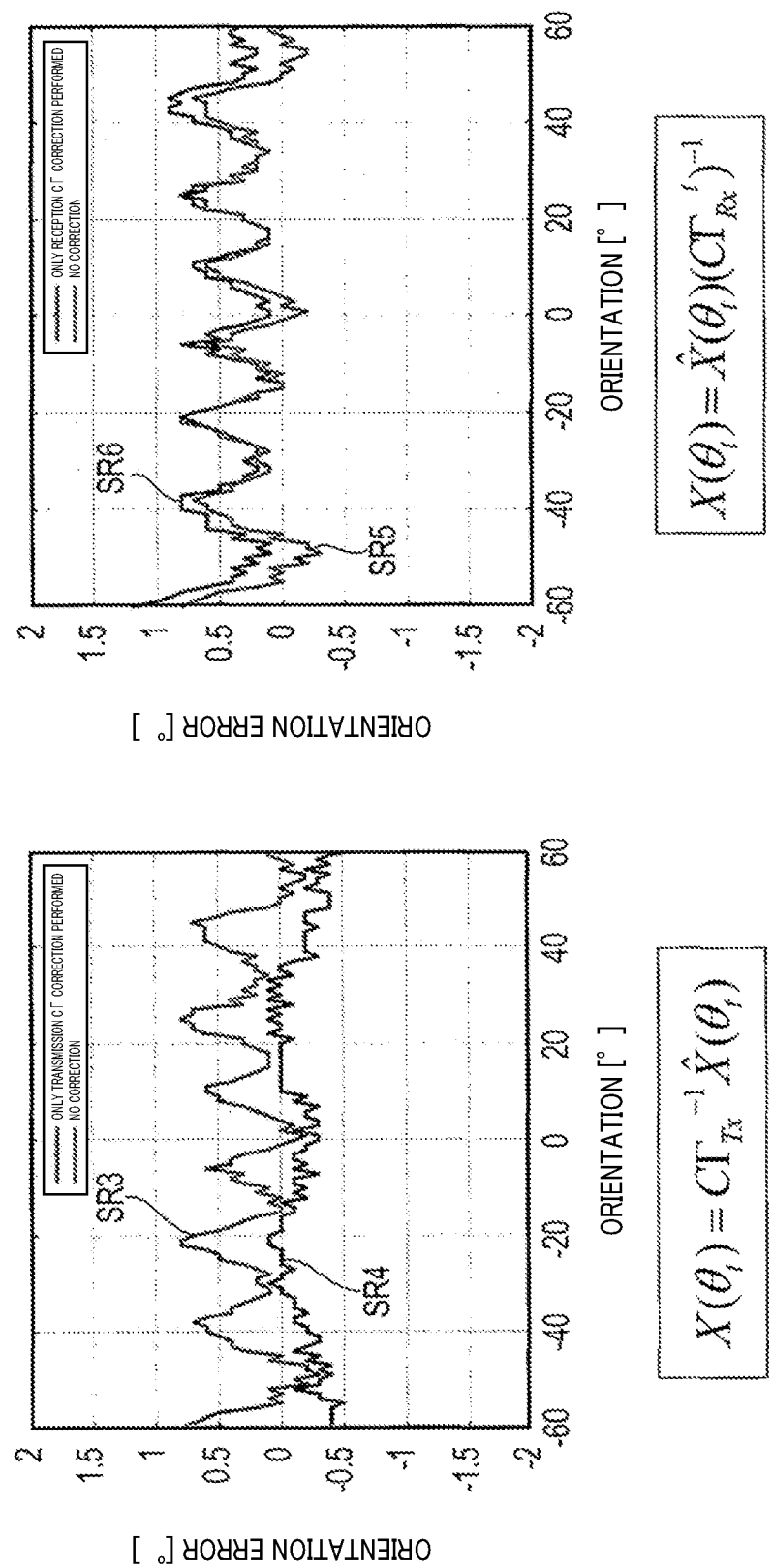
FIG. 16 is a diagram of second and third simulation results.

FIG. 16 shows second and third simulation results indicating a relationship between detected orientation and orientation error. In the second simulation result, orientation-orientation error characteristics SR3 are the results when correction is not performed. Orientation-orientation error characteristics SR4 are the results when correction using the inter-transmission coupling matrix is performed. In the third simulation result, orientation-orientation error characteristics SR5 are the results when correction is not performed. Orientation-orientation error characteristics SR6 are the results when correction using the inter-reception coupling matrix is performed.

As shown in FIG. 16, in the correction using only either of the inter-reception coupling matrix and the inter-transmission coupling matrix, removal of the components of coupling is insufficient.

According to the embodiment described above, the inter-element mutual coupling matrix included in the inter-reception coupling matrix corresponds to a reception mutual coupling matrix. The inter-element mutual coupling matrix included in the inter-transmission coupling matrix corresponds to a transmission mutual coupling matrix. S380 corresponds to a process as an individual correcting unit.

Second Embodiment

A second embodiment of the present embodiment is described below with reference to the drawings. Here, according to the second embodiment, sections differing from those according to the first embodiment are described. Shared configurations are given the same reference numbers.

The radar apparatus 1 according to the second embodiment differs from that according to the first embodiment in that the information generation process is modified.

The information generation process according to the second embodiment differs from that according to the first embodiment in that a process at S382 is performed instead of the process at S380.

Figure 17:
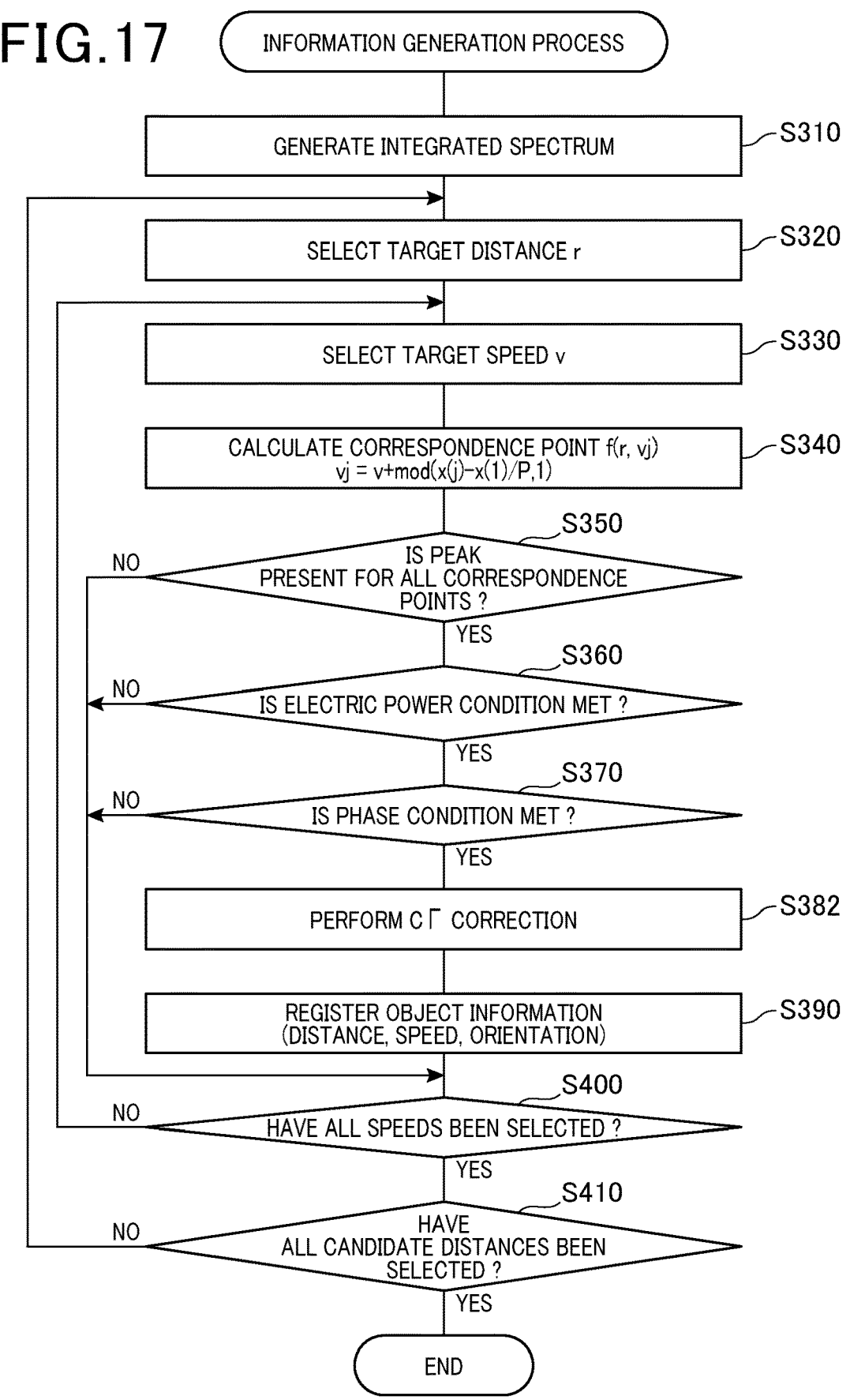
FIG. 17 is a flowchart of an information generation process according to a second embodiment.

That is, as shown in FIG. 17, upon completing the process at S370, at S382, the processor 6 acquires the virtual reception signals after CΓ correction by multiplying the virtual reception signal matrix by a CΓ correction term $CΓ^{-1}$ as shown in expression (30). Then, upon completing the process at S382, the processor 6 proceeds to S390.

$$X(\theta_t) = CΓ^{-1} * \hat{X}(\theta_t) \quad (30)$$

As shown in FIG. 18, the CΓ correction term $CΓ^{-1}$ is an inverse matrix of an inter-all-virtual-channel coupling matrix CΓ in which the inter-element mutual coupling matrix C of all virtual reception antennas included in the virtual array and the element characteristics matrix Γ of all virtual reception antennas included in the virtual array are multiplied.

For example, as shown in FIG. 11, the transmission antenna unit 3 includes two transmission antennas. The reception antenna unit 4 includes five reception antennas. An object to be detected is present in a direction that is tilted by an angle $\theta_t$ in relation to the front direction of the transmission antenna unit 3 and the reception antenna unit 4. In this case, a virtual integration mode vector is expressed by expression (31) and the inter-all-virtual-channels coupling matrix is expressed by expression (32).

Furthermore, the ideal reception signal is expressed by expression (33) using the virtual integration mode vector. In addition, a reception signal that includes an inter-channel isolation error is expressed by expression (34).

$$a(\theta) = \left[ 1 \quad e^{j2\pi\frac{d_R \sin\theta}{\lambda}} \quad \ldots \quad e^{j2\pi\frac{4d_R \sin\theta}{\lambda}} \right. \quad (31)$$

$$\left. e^{j2\pi\frac{d_T \sin\theta}{\lambda}} \quad e^{j2\pi\frac{(d_T+d_R)\sin\theta}{\lambda}} \quad \ldots \quad e^{j2\pi\frac{(d_T+4d_R)\sin\theta}{\lambda}} \right]^T$$

$$CΓ = \begin{bmatrix} 1 & \Delta_{1,2} & \Delta_{1,3} & \ldots & \Delta_{1,9} & \Delta_{1,10} \\ \Delta_{2,1} & 1 & \Delta_{2,3} & \ldots & \Delta_{2,9} & \Delta_{2,10} \\ \Delta_{3,1} & \Delta_{3,2} & 1 & \ldots & \Delta_{3,9} & \Delta_{3,10} \\ \vdots & \vdots & \vdots & \ddots & \vdots & \vdots \\ \Delta_{9,1} & \Delta_{9,2} & \Delta_{9,3} & \ldots & 1 & \Delta_{9,10} \\ \Delta_{10,1} & \Delta_{10,2} & \Delta_{10,3} & \ldots & \Delta_{10,9} & 1 \end{bmatrix} \quad (32)$$

$$X(\theta_t) = a(\theta_t) \quad (33)$$

$$\hat{X}(\theta_t) = CΓ * a(\theta_t) \quad (34)$$

Therefore, as shown in expression (30), the ideal reception signals can be acquired by the reception signals including the inter-channel isolation error being multiplied by the inverse matrix of the inter-all-virtual-channels coupling matrix.

In the radar apparatus 1 configured in this manner, the processor 6 corrects the M×N virtual reception signals by multiplying the virtual reception signal matrix by the inverse matrix of the inter-all-virtual-channels coupling matrix CΓ.

As a result, the radar apparatus 1 can calculate the virtual reception signals in which, in addition to the effects of mutual coupling among the N reception antennas, the effects of the mutual coupling among the M transmission antennas are also reduced. Detection accuracy regarding the orientation of the object can be improved.

According to the embodiment described above, the inter-element mutual coupling matrix included in the inter-all-virtual-channels coupling matrix CΓ corresponds to a virtual mutual coupling matrix. S382 corresponds to a process as a collective correcting unit.

Embodiments of the present disclosure are described above. However, the present disclosure is not limited to the above-described embodiments and can be carried out through various modifications.

VARIATION EXAMPLE 1

According to the above-described embodiments, an aspect in which the reception CΓ correction term $CΓ_{Rx}^{-1}$ is calculated by expression (14) is given. However, the reception CΓ correction term $CΓ_{Rx}^{-1}$ may be made to coincide with either of the inter-reception coupling matrices $CΓ_{R1}$ and $CΓ_{R2}$. As a result, processing load for calculating the reception CΓ correction term $CΓ_{Rx}^{-1}$ can be reduced.

VARIATION EXAMPLE 2

According to the above-described embodiments, an aspect in which the transmission CΓ correction term $CΓ_{Tx}^{-1}$ is calculated by expression (15) is given. However, the transmission CΓ correction term $CΓ_{Tx}^{-1}$ may be made to coincide with any of the inter-transmission coupling matrices $CΓ_{T1}$, $CΓ_{T2}$, $CΓ_{T3}$, $CΓ_{T4}$, and $CΓ_{T5}$. As a result, processing load for calculating the transmission CΓ correction term $CΓ_{Tx}^{-1}$ can be reduced.

Moreover, a function provided by a single constituent element according to the above-described embodiments may be divided among a plurality of constituent elements. Functions provided by a plurality of constituent elements may be provided by a single constituent element. In addition, a part of a configuration according to the above-described embodiments may be omitted. Furthermore, at least a part of a configuration according to an above-described embodiment may be added to or replace a configuration according to another of the above-described embodiments.

The present disclosure can also be actualized by various modes in addition to the above-described radar apparatus 1, such as a system of which the radar apparatus 1 is a constituent element.

What is claimed is:

1. A radar apparatus comprising:
 a transmission antenna unit that includes a plurality of transmission antennas that are arranged in a row along an array direction that is set in advance;
 an oscillator that generates a common signal that is a continuous wave;
 a modulator that generates a plurality of transmission signals that are inputted to the plurality of transmission antennas, by performing phase-shift keying in which a phase of a split signal is rotated at each repetition period set in advance, by a phase rotation amount that differs for each of a plurality of split signals generated by splitting the common signal into a same number of signals as a number of antennas in the plurality of transmission antennas;
 a reception antenna unit that includes a plurality of reception antennas that are arranged in a row along the array direction; and
 a processor that generates information related to an object that reflects a radiation wave from the transmission antenna unit based on a plurality of signal components corresponding to the plurality of transmission signals extracted from each of a plurality of reception signals received by the reception antenna unit, wherein
 the plurality of transmission antennas and the plurality of reception antennas form a virtual array in which a plurality of virtual reception antennas are arranged in a row along the array direction, and the processor includes an individual correcting unit that corrects a plurality of virtual reception signals by multiplying a virtual reception signal matrix that indicates each of the plurality of virtual reception signals received by the plurality of virtual reception antennas by at least an inverse matrix of a reception mutual coupling matrix that indicates mutual coupling among the plurality of reception antennas and an inverse matrix of a transmission mutual coupling matrix that indicates mutual coupling among the plurality of transmission antennas.

2. A radar apparatus comprising:

a transmission antenna unit that includes a plurality of transmission antennas that are arranged in a row along an array direction that is set in advance;

an oscillator that generates a common signal that is a continuous wave;

a modulator that generates a plurality of transmission signals that are inputted to the plurality of transmission antennas, by performing phase-shift keying in which a phase of a split signal is rotated at each repetition period set in advance, at a phase rotation amount that differs for each of a plurality of split signals generated by splitting the common signal into a same number of signals as a number of antennas in the plurality of transmission antennas;

a reception antenna unit that includes a plurality of reception antennas that are arranged in a row along the array direction; and a processor that generates information related to an object that reflects a radiation wave from the transmission antenna unit based on a plurality of signal components corresponding to the plurality of transmission signals extracted from each of a plurality of reception signals received by the reception antenna unit, wherein the plurality of transmission antennas and the plurality of reception antennas form a virtual array in which a plurality of virtual reception antennas are arranged in a row along the array direction, and the processor includes a collective correcting unit that corrects a plurality of virtual reception signals by multiplying a virtual reception signal matrix that indicates each of the plurality of virtual reception signals received by the plurality of virtual reception antennas by at least an inverse matrix of a virtual mutual coupling matrix that indicates mutual coupling among the plurality of virtual reception antennas.

3. The radar apparatus according to claim 1, wherein:

the reception mutual coupling matrix indicates mutual coupling among the plurality of virtual reception antennas corresponding to a single transmission antenna among the plurality of transmission antennas.

4. The radar apparatus according to claim 1, wherein:

the transmission mutual coupling matrix indicates mutual coupling among the plurality of virtual reception antennas corresponding to a single reception antenna among the plurality of reception antennas.

5. The radar apparatus according to claim 3, wherein:

the transmission mutual coupling matrix indicates mutual coupling among the plurality of virtual reception antennas corresponding to a single reception antenna among the plurality of reception antennas.

* * * * *